United States Patent
Webber et al.

(10) Patent No.: US 6,915,979 B2
(45) Date of Patent: Jul. 12, 2005

(54) ACCELERATION SENSOR ASSEMBLY FOR RESTRAINT RETRACTOR

(75) Inventors: James L. Webber, Shelby Township, MI (US); Kevin Wei-Loong Ng, Pontiac, MI (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 10/673,617

(22) Filed: Sep. 29, 2003

(65) Prior Publication Data

US 2005/0067520 A1  Mar. 31, 2005

(51) Int. Cl.$^7$ .............................................. B60R 22/40
(52) U.S. Cl. .................................... 242/384.4; 297/478
(58) Field of Search ............................. 242/384.4, 384, 242/384.1, 384.5, 384.6; 297/478; 280/806

(56) References Cited

U.S. PATENT DOCUMENTS

| 5,495,994 A | 3/1996 | Rumpf et al. ............ 242/384.4 |
| 5,791,582 A | 8/1998 | Ernst ........................ 242/384.4 |
| 5,820,060 A | * 10/1998 | Yano ........................ 242/384.4 |
| 6,164,581 A | 12/2000 | Freeman et al. .......... 242/384.4 |
| 6,283,553 B1 | 9/2001 | Anderson et al. ........... 297/478 |
| 6,386,472 B1 | 5/2002 | Rogers, Jr. ................. 242/384 |

* cited by examiner

*Primary Examiner*—John M. Jillions
(74) *Attorney, Agent, or Firm*—Scott A. McBain (57) ABSTRACT

An acceleration sensor assembly for a restraint retractor of a seat restraint system in a vehicle includes an acceleration sprocket operatively connected to the restraint retractor. The acceleration sensor assembly also includes an acceleration pawl cooperating with the acceleration sprocket to operatively cause lock up of the restraint retractor. The acceleration sensor assembly includes an inertia member cooperating with the acceleration pawl to move the acceleration pawl when an acceleration force is present and a gimbal to support the inertia member. The acceleration sensor assembly further includes a non-contact damping mechanism cooperating with the gimbal to dampen movement of the gimbal until the acceleration force exceeds a predetermined value and the inertia member actuates the acceleration pawl to engage the acceleration sprocket to operatively cause lock up of the restraint retractor and prevent unwinding of a belt from the restraint retractor.

26 Claims, 6 Drawing Sheets

ACCELERATION SENSOR ASSEMBLY FOR RESTRAINT RETRACTOR

TECHNICAL FIELD

The present invention relates generally to seat restraint systems for vehicles and, more particularly, to an acceleration sensor assembly for a restraint retractor of a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a restraint retractor for the seat restraint system. Typically, the restraint retractor has a spool attached to belt webbing of the seat restraint and is rotatably mounted to the restraint retractor by a shaft. The restraint retractor has a spiral spring on one end of the shaft to urge the spool in a direction for retracting the belt webbing when not in use. Also, the restraint retractor has a toothed locking sprocket on the other end of the shaft and a locking pawl to engage the sprocket to lock the shaft against rotation in the other direction to prevent belt webbing unwinding. The locking sprocket is typically slaved to an acceleration sprocket via a spring and an acceleration pawl is actuated by an acceleration sensing mechanism or sensor. The acceleration sensor includes a mass member or "standing man" that may be spherically shaped or frusto-conical in shape to engage and actuate the acceleration pawl.

The restraint retractor may be attached to the seat or vehicle body. In an "all belts to seat" or "seat integrated restraint" application, the restraint retractor is attached to a frame of a seat back of the seat. When the restraint retractor is attached to the seat, the acceleration sensor is sensitive and the mass member is easily activated, such as when the seat back is reclined, thereby actuating the acceleration pawl to engage the acceleration sprocket and operatively causing the locking sprocket and locking pawl to engage via the spring to lock the shaft of the restraint retractor against rotation. This condition is undesired.

To overcome this condition, some restraint retractors have been provided with a two mass system to actuate the acceleration pawl. In the two mass system, a big mass is provided, which lags a small mass that actuates the acceleration pawl. However, these restraint retractors have a high noise level, bulky package, and decreased sensitivity on low speed decelerations (pre-impact braking).

Therefore, it is desirable to provide an acceleration sensor for a restraint retractor of a seat restraint system in a vehicle for an "all belts to seat" application to allow acceleration sensing. It is also desirable to provide an acceleration sensor for a restraint retractor of a seat restraint system in a vehicle that has higher sensitivity to low speed decelerations (pre-impact braking). It is further desirable to provide an acceleration sensor for a restraint retractor of a seat restraint system in a vehicle that reduces noise and packaging size. It is still further desirable to provide a seat integrated vehicle sensing mechanism that allows a vehicle seatback to recline at a predetermined range of angle while maintaining its sensitivity and effectiveness.

SUMMARY OF THE INVENTION

Accordingly, the present invention is an acceleration sensor assembly for a restraint retractor of a seat restraint system including an acceleration sprocket operatively connected to the restraint retractor. The acceleration sensor assembly also includes an acceleration pawl cooperating with the acceleration sprocket to operatively cause lock up of the restraint retractor. The acceleration sensor assembly includes an inertia member cooperating with the acceleration pawl to move the acceleration pawl when an acceleration force is present and a gimbal to support the inertia member. The acceleration sensor assembly further includes a non-contact damping mechanism cooperating with the gimbal to dampen movement of the gimbal until the acceleration force exceeds a predetermined value and the inertia member actuates the acceleration pawl to engage the acceleration sprocket to operatively cause lock up of the restraint retractor and prevent unwinding of a belt from the restraint retractor.

One advantage of the present invention is that an acceleration sensor assembly is provided for a restraint retractor of a seat restraint system in a vehicle for an "all belts to seat" or "integrated seat restraint" application to allow acceleration sensing. Another advantage of the present invention is that the acceleration sensor assembly has a low noise level, eliminating extra cost for a bulky noise insulation cover. Yet another advantage of the present invention is that the acceleration sensor assembly has higher sensitivity to low speed decelerations (pre-impact braking). Still another advantage of the present invention is that the acceleration sensor assembly has a slender side profile to maintain compactness for the restraint retractor. A further advantage of the present invention is that the acceleration sensor assembly is lighter in mass. Yet a further advantage of the present invention is that the acceleration sensor assembly utilizes a magnetic damper on a gimbal mechanism to provide higher sensitivity, particularly at low speeds. Another advantage of the present invention is that the acceleration sensor assembly employs magnetic damping to provide a gimbal within a predetermined seatback angle range, better damping force on the gimbal during vehicle acceleration/deceleration, and superior sensitivity on vehicle acceleration sensor. Yet another advantage of the present invention is that the acceleration sensor assembly utilizes eddy current damping in conjunction with an inertia member that is quiet, compact, light weight, and cost effective.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
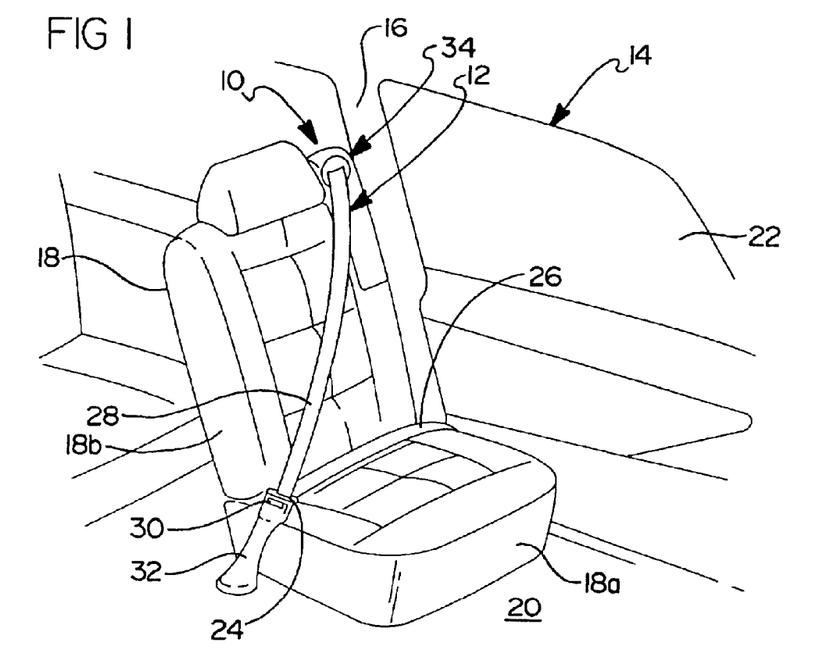
FIG. 1 is a perspective view of an acceleration sensor assembly, according to the present invention, illustrated in operational relationship with a seat restraint system of a vehicle.
Figure 2:
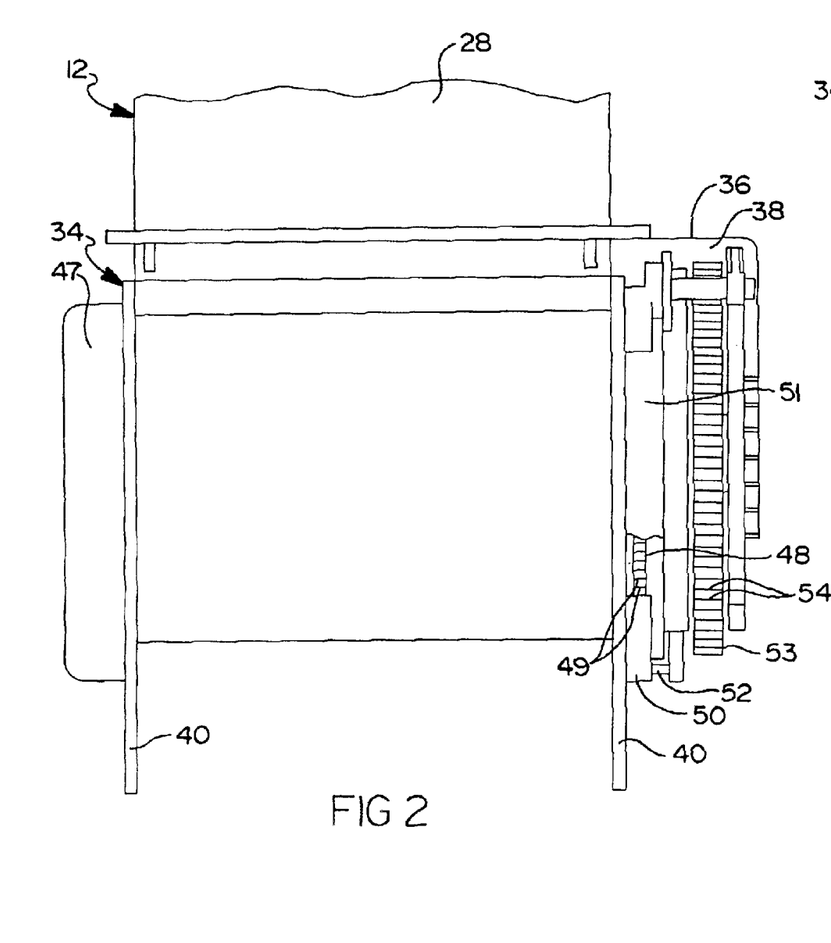
FIG. 2 is a side elevational view of the acceleration sensor assembly and a restraint retractor of the seat restraint system of FIG. 1.

Referring to the drawings and in particular FIGS. 1 and 2, one embodiment of an acceleration sensor assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. The seat 18 has a seat cushion 18a and a seat back 18b pivotally connected to the seat cushion 18a by suitable means (not shown). It should be appreciated that the seat 18 could be a rear, second row or third row seat for the vehicle 14.

The vehicle 14 includes the seat restraint system 12 for restraining an occupant (not shown) in the seat 18. The seat restraint system 12 includes a latch tongue or plate 24 connected to an end of either one of a lap belt 26, shoulder belt 28, or both which have another end connected to a restraint retractor 34 to be described. The seat restraint system 12 also includes a buckle assembly 30 connected by suitable means such as belt webbing 32 to the vehicle structure 20. The latch plate 24 is engageable and disengageable with the buckle assembly 30 as is known in the art. It should be appreciated that, except for the acceleration sensor assembly 10, the seat restraint system 12 and vehicle 14 are conventional and known in the art.

Figure 3:
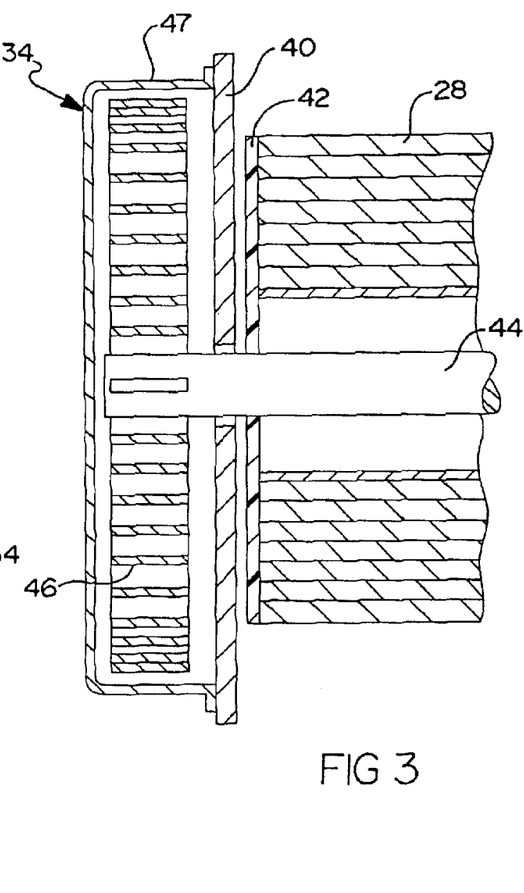
FIG. 3 is a fragmentary view of a portion of the restraint retractor of FIG. 2.

Referring to FIGS. 2 and 3, the seat restraint system 12 includes a restraint retractor, generally indicated at 34, connected to the shoulder belt 28. The restraint retractor 34 includes a housing 36 having a base wall 38 and spaced apart sidewalls 40. The restraint retractor 34 also includes a belt reel or take-up spool 42 disposed between the sidewalls 40 and connected by suitable means to the end of the shoulder belt 28. The restraint retractor 34 also includes a shaft 44 extending through the take-up spool 42 and the sidewalls 40 of the housing 36 such that the take-up spool 42 is rotatable relative to the housing 36. It should be appreciated that the housing 36 is attached by suitable means (not shown) to a frame (not shown) of the seat back 18b for the seat 18.

The restraint retractor 34 also includes a retractor spring 46 disposed about one end of the shaft 44. The retractor spring 46 is of a spiral type having one end attached to the shaft 44 and another end connected to the housing 36 as is known in the art. The retractor spring 46 may be enclosed by a spring housing 47 attached to the sidewall 40 of the housing 36. The retractor spring 46 has a predetermined torque or tension and urges the shaft 44 in a predetermined direction to wind up the shoulder belt 28 on the take-up spool 42. It should be appreciated that the restraint retractor 34 may have a structure similar to that disclosed in U.S. Pat. No. 4,815,674 to Blake et al.

The restraint retractor 34 also includes a locking sprocket 48 attached to and rotatable with the other end of the shaft 44 opposite the spring 46. The locking sprocket 48 has a plurality of teeth 49 disposed circumferentially thereabout. The restraint retractor 34 includes a locking pawl 50 pivotally connected to a side wall 40 of the housing 36 by suitable means such as a pin (not shown). The locking pawl 50 is engageable with the teeth 49 to lock the shaft 44 relative to the housing 36. The restraint retractor 34 also includes a guide member 51 disposed about the shaft 44 and has a locking arm (not shown) engageable with the teeth 49 on the locking sprocket 48 and a slot (not shown) extending therethrough to receive a pin 52 extending from the locking pawl 50 and received in the slot. When the belt webbing of the shoulder belt 28 is unwound above a predetermined rate, the locking arm engages the teeth 49 to rotate the guide member 51 and move the slot relative to the pin 52, causing the locking pawl 50 to pivot and engage the teeth 49 to lock the shaft 44 against rotation. It should be appreciated that the restraint retractor 34 is conventional and known in the art.

Figure 4:
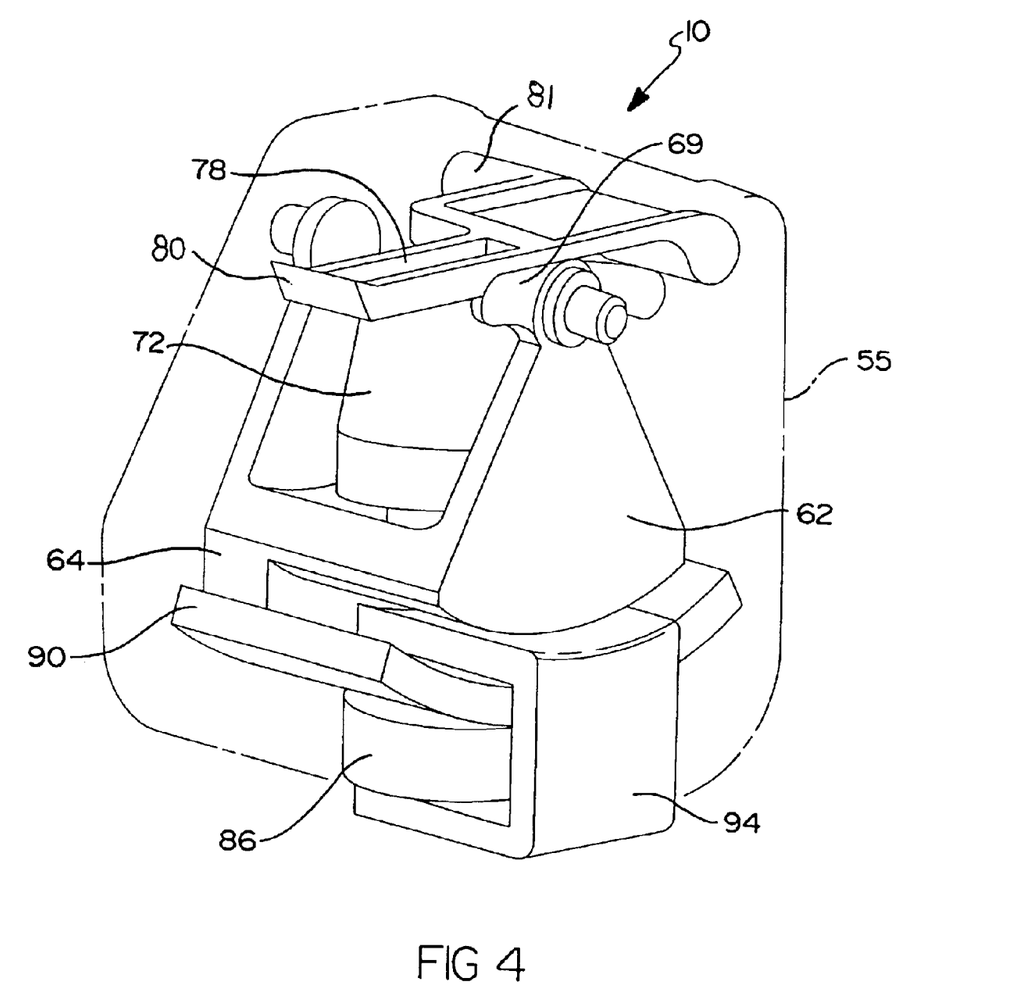
FIG. 4 is a perspective view of the acceleration sensor assembly of FIG. 1.
Figure 5:
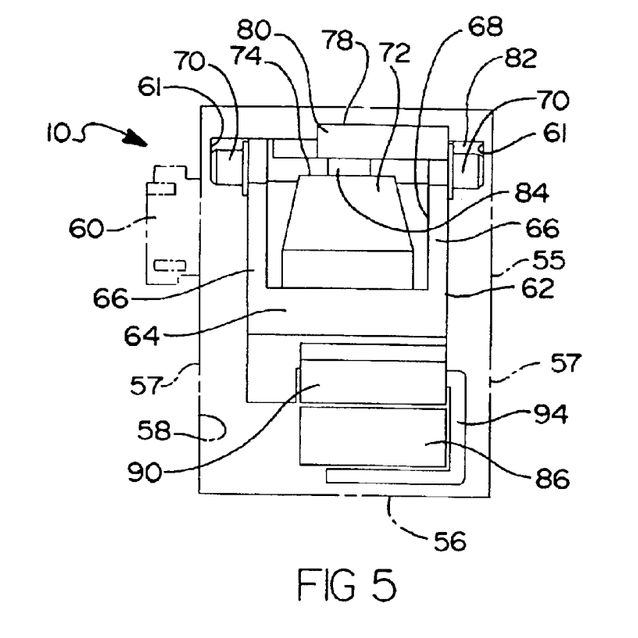
FIG. 5 is a front elevational view of the acceleration sensor assembly of FIG. 4.

Referring to FIGS. 2, 4, and 5, the acceleration sensor assembly 10, according to the present invention, includes an acceleration sprocket or disc 53 attached to and disposed about the end of the shaft 44 of the restraint retractor 34. The acceleration sprocket 53 is generally circular in shape and has a plurality of teeth 54 disposed circumferentially thereabout. The sprocket 53 is connected to the locking sprocket 48 via a spring (not shown) such that the acceleration sprocket 53 can rotate with the locking sprocket 48 at the same speed or relative thereto at different speeds. It should be appreciated that the acceleration sprocket 53 is a slave type member.

The acceleration sensor assembly 10 also includes a support housing 55 connected by suitable means to the retractor housing 36. The support housing 55 is generally rectangular in shape. The support housing 55 has a base wall 56 and opposed side walls 57 extending generally perpendicular to the base wall 56 to form a cavity 58 therein. The support housing 55 has a projection 60 extending from one of the side walls 57 for connection to the retractor housing 36. The support housing 55 also has a pair of opposed cavities 61 extending into the side walls 57 near a top thereof for a function to be described. The support housing 55 has a pair of apertures (not shown) extending laterally through the sidewalls 57 and spaced vertically from the cavities 61 near a top thereof. The support housing 55 is made of a rigid material, preferably a plastic material. The support housing 55 is a monolithic structure being integral, unitary, and formed as one-piece.

The acceleration sensor assembly 10 also includes a gimbal 62 disposed in the cavity 58 of the support housing 55. The gimbal 62 is generally "U" shaped and has a base wall 64 and opposed side walls 66 extending generally perpendicular to the base wall 64 to form a cavity 68 therein. The gimbal 62 has a projection 70 extending laterally outwardly from each side wall 66 and disposed in the cavities 61 of the support housing 55 to connect and to allow pivotal movement of the gimbal 62 relative to the support housing 55. The gimbal 62 has a predetermined mass. The gimbal 62 is made of a rigid material such as plastic. It should be appreciated that the gimbal 62 may have any suitable shape. It should also be appreciated that the gimbal 62 acts as a swinging pendulum or plumb bob.

The acceleration sensor assembly 10 includes an out of range sensor 69 connected to the gimbal 62 on one of the side walls 66 for a function to be described. The out of range sensor 69 cooperates with a sensor lever 78 to be described to lock the restraint retractor 34 when the seat back 18b of the seat 18 is reclined outside a range of predetermined operating angles. The out of range sensor 69 will be described in more detail in connection with FIGS. 7A through 7C.

The acceleration sensor assembly 10 also includes an inertia member 72 such as a "standing man" disposed in the cavity 68 of the gimbal 62. The inertia member 72 is generally cylindrical in shape. The inertia member 72 also has a recess 74 in an upper end thereof. The recess 74 is arcuate in shape for a predetermined curve for certain range of acceleration from approximately 0.26 to approximately 0.7 G's, preferably approximately 0.4 G's, for a function to be described. The inertia member 72 has a predetermined mass that is different from the predetermined mass of the gimbal 62. The inertia member 72 is made of a metal material such as brass. It should be appreciated that the inertia member 72 may have any suitable shape such as a sphere.

The acceleration sensor assembly 10 includes an acceleration or sensor lever 78 extending longitudinally and having a tooth portion 80 extending outwardly from an end thereof for engaging the teeth 54 on the acceleration sprocket 53. The sensor lever 78 also has a cam surface (not shown) for cooperating with the out of range sensor 69 as described in connection with FIGS. 7A through 7C. The sensor lever 78 is pivotally connected to the support housing 55 by suitable means such as a pin 82 extending through the apertures of the support housing 55. The sensor lever 78 has a projection 84 extending toward the cavity 58 of the support housing 55 and is disposed in the recess 74 to engage the inertia member 72. The sensor lever 78 is made of a rigid material, preferably a plastic material. The sensor lever 78 is a monolithic structure being integral, unitary, and one-piece. It should be appreciated that the sensor lever 78 may be a two-piece lever for a sphere shaped inertia member. It should also be appreciated that the projection 84 of the sensor lever 78 is positioned collinearly to a pivoting axis of the gimbal 62. It should be appreciated that, upon receiving an acceleration force, the inertia member 72 pivots to move the sensor lever 78 to engage the teeth 54 to stop rotation of the acceleration sprocket 53 to cause the locking pawl 50 via the spring to engage the teeth 49 on the locking sprocket 48 and lock the shaft 44 to prevent pay-out of the shoulder belt 28. It should further be appreciated that the acceleration sprocket 53 and locking sprocket 48 form a slave type system.

The acceleration sensor assembly 10 further includes a single magnet 86 disposed within the housing 55. The magnet 86 is of a Neodymium permanent or rare earth magnet type. The acceleration sensor assembly 10 also includes a single conductive member 90 connected to the base wall 64 of the gimbal 62. The conductive member 90 has a generally arcuate or curved shape. The conductive member 90 is a single plate made of a non-magnetic and electrically conductive material such as copper. The acceleration sensor assembly 10 also includes a focusing member 94 disposed in the housing 55 beneath the gimbal 62 and having a generally "U" shaped cross-section. The focusing member 94 is made of a flux directing magnetic material. The focusing member 94 is secured to the housing 55 by suitable means. The magnet 86 is disposed below or beneath the conductive member 90 within the focusing member 94. It should be appreciated that the gimbal 62, magnet 86, and conductive member 90 form a non-contact or eddy current damping mechanism. It should also be appreciated that the focusing member 94 cooperates with the magnet 86 for magnetic field focusing and flux redirecting. It should further be appreciated that the magnet 86 and conductive member 90 form a horizontal arrangement.

In operation of the acceleration sensor assembly 10, when a sudden vehicle acceleration or deceleration is detected such as when the vehicle 14 is subjected to a "G" load from 0.26 G's to 0.7 G's, the dynamic motion of the gimbal 62 is dampened out by the magnetic interaction between the magnet 86 and the conductive member 90. This forces the inertia member 72 to tilt and exert an upwardly directed force on the projection 84 of the sensor lever 78. The sensor lever 78 will in turn be lifted into its actuating position to engage the acceleration sprocket 53 to stop rotation thereof, in turn, causing the locking pawl 50 via the spring to engage the locking sprocket 48, locking-up the restraint retractor 34. When the G load is less than 0.26 G's, the inertia member 72 maintains its neutral position and the restraint retractor 34 is unlocked when the shoulder belt 28 goes back into the restraint retractor 34. It should be appreciated that for an acceleration greater than the designed "G" load, the restraint retractor 34 will lock-up in a normal manner via the locking pawl 50 and locking sprocket 48.

When the seat back 18b of the seat 18 is reclined at a predetermined operating angle such as between a range of thirteen degrees (13°) to thirty-five degrees (35°), preferably minus twenty-five degrees (−25°) to positive twenty-five degrees (25°), the gimbal 62 and its attached components will rotate to a fixed resting position where the combined center of mass is always pointed towards the center of gravity and prevents the restraint retractor 34 from locking up. In the case where the seat back 18b of the seat 18 is reclined outside the range of the predetermined operating angles, the out of range sensor 69 will exert an upwardly directed force on the sensor lever 78, lifting its pawl into the actuating position. It should be appreciated that the out of range sensor 69 will be described in more detail in relation to FIGS. 7A through 7C. It should also be appreciated that, when the seat back 18b of the seat 18 is reclined within the range of the predetermined operating angles, the gimbal 62 maintains the inertia member 72 in a position that will not lock up the restraint retractor 34. It should further be appreciated that the acceleration sensor assembly 10 allows the seat back 18a to recline at predetermined angles while maintaining the sensitivity and effectiveness of the acceleration sensor assembly 10. It should still further be appreciated that the acceleration sensor assembly 10 does not lock the restraint retractor 34 to any angle fifteen degrees (15°) or less from its orientation in the vehicle (0.26 G's or less) and locks to any angle forty-five degrees (45°) or greater from its orientation in the vehicle (0.7 G's or more).

Figure 6A:
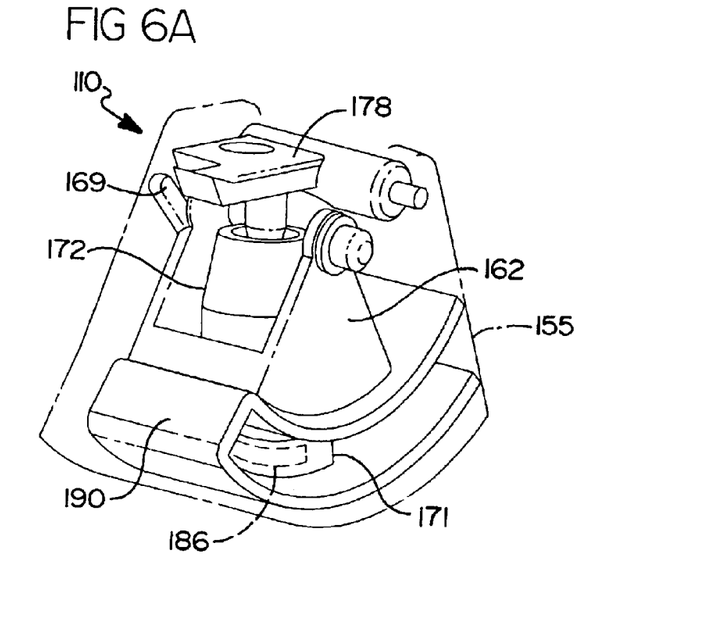
FIG. 6A is a perspective view of another embodiment, according to the present invention, of the acceleration sensor assembly of FIG. 4.

Referring to FIG. 6A, another embodiment, according to the present invention, of the acceleration sensor assembly 10 is shown. Like parts of the acceleration sensor assembly 10 have like reference numerals increased by one hundred (100). In the embodiment illustrated in FIG. 6A, the acceleration sensor assembly 110 includes the conductive member 190 disposed beneath the gimbal 162 and having a generally "U" shaped cross-section. The conductive member 190 is secured to the housing 155 by suitable means. The acceleration sensor assembly 110 includes at least one magnet 186 connected to an "L" shaped projection 171 extending from the gimbal 162 and disposed within the conductive member 190. The acceleration sensor assembly 110 further includes the inertia member 172, out of range sensor 169, and sensor lever 178. It should be appreciated that the operation of the acceleration sensor assembly 110 is similar to the acceleration sensor assembly 10. It should also be appreciated that the magnet 186 and conductive member 190 have a horizontal arrangement. It should further be appreciated that the acceleration sensor assembly 110 has an overall height reduction compared to the acceleration sensor assembly 10.

Figure 6B:
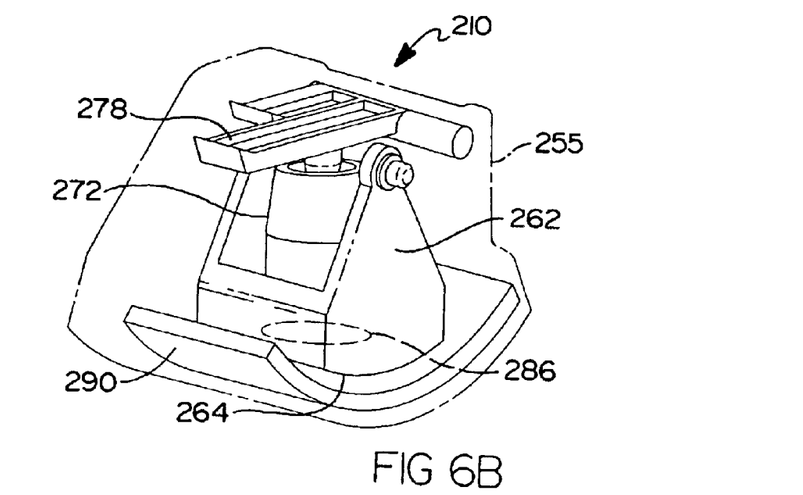
FIG. 6B is a perspective view of yet another embodiment, according to the present invention, of the acceleration sensor assembly of FIG. 4.

Referring to FIG. 6B, yet another embodiment, according to the present invention, of the acceleration sensor assembly 10 is shown. Like parts of the acceleration sensor assembly 10 have like reference numerals increased by two hundred (200). In the embodiment illustrated in FIG. 6B, the acceleration sensor assembly 210 includes a single magnet 286 connected to the base wall 264 of the gimbal 262. The acceleration sensor assembly 210 also includes a single conductive member 290 disposed below or beneath the magnet 286. The conductive member 290 has a generally arcuate or curved shape. The conductive member 290 is a single plate. The conductive member 290 is secured to the housing 255 by suitable means. The acceleration sensor assembly 210 further includes the inertia member 272, out of range sensor (not shown), and sensor lever 278. It should be appreciated that the operation of the acceleration sensor assembly 210 is similar to the acceleration sensor assembly 10. It should also be appreciated that the magnet 286 and conductive member 290 have a horizontal arrangement. It should further be appreciated that the acceleration sensor assembly 210 has an overall height reduction compared to the acceleration sensor assembly 10 and is compact.

Figures 6C, 6D, 6E:
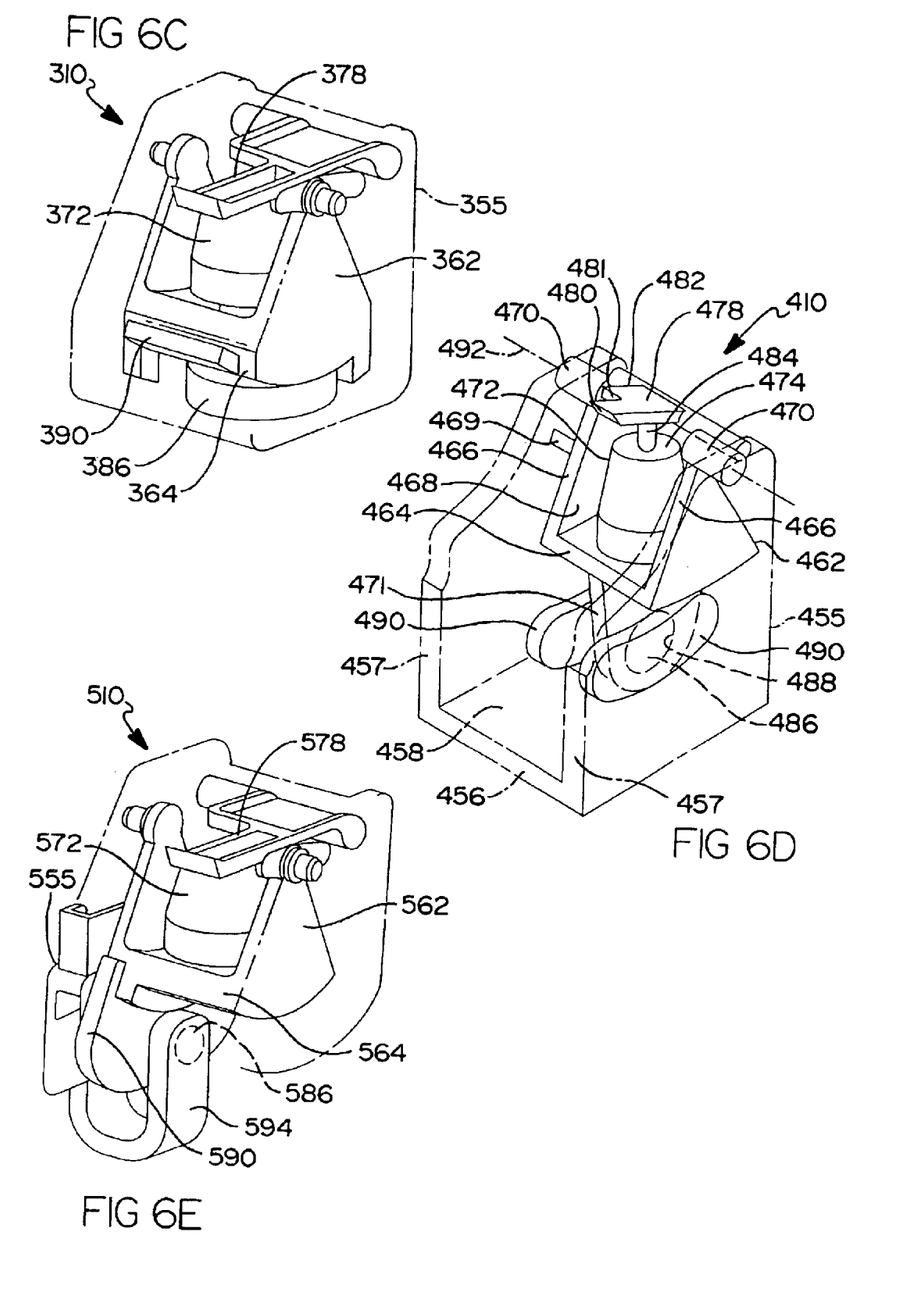
FIG. 6C is a perspective view of still another embodiment, according to the present invention, of the acceleration sensor assembly of FIG. 4.
FIG. 6D is a perspective view of a further embodiment, according to the present invention, of the acceleration sensor assembly of FIG. 4.
FIG. 6E is a perspective view of a still further embodiment, according to the present invention, of the acceleration sensor assembly of FIG. 4.

Referring to FIG. 6C, still another embodiment, according to the present invention, of the acceleration sensor assembly 10 is shown. Like parts of the acceleration sensor assembly 10 have like reference numerals increased by three hundred (300). In the embodiment illustrated in FIG. 6C, the acceleration sensor assembly 310 includes a single conductive member 390 connected to the base wall 364 of the gimbal 362. The acceleration sensor assembly 310 also includes a single magnet 386 disposed below or beneath the conductive member 390. The magnet 386 is secured to the housing 355 by suitable means. The acceleration sensor assembly 310 further includes the inertia member 372, out of range sensor (not shown), and sensor lever 378. It should be appreciated that the operation of the acceleration sensor assembly 310 is similar to the acceleration sensor assembly 10. It should also be appreciated that the magnet 386 and conductive member 390 have a horizontal arrangement. It should further be appreciated that the acceleration sensor assembly 310 has a reverse magnet/electric conductive member configuration compared to the acceleration sensor assembly 210.

Referring to FIG. 6D, a further embodiment, according to the present invention, of the acceleration sensor assembly 10 is shown. Like parts of the acceleration sensor assembly 10 have like reference numerals increased by four hundred (400). In the embodiment illustrated in FIG. 6D, the acceleration sensor assembly 410 includes the gimbal 462 having a projection 471 extending axially from the base wall 464 for a function to be described. The acceleration sensor assembly 410 further includes at least one magnet 486 mounted to the projection 471 of the gimbal 462 by suitable means such as an adhesive (not shown) or press-fit into an aperture 488 extending therethrough. The acceleration sensor assembly 410 includes at least one, preferably a pair of the conductive members 490 disposed in the support housing 455 and spaced laterally. The conductive members 490 are generally planar and "U" shaped. The conductive members 490 are mounted to the support housing 455 by suitable means such as an adhesive (not shown) such that the magnet 486 is disposed between the conductive members 490. The acceleration sensor assembly 410 further includes the inertia member 472, out of range sensor (not shown), and sensor lever 478. The out of position sensor is used for ±20 degrees gimbal range with five degrees out of position kickoff. It should be appreciated that the gimbal 462, magnet 486, and conductive members 490 form a non-contact or eddy current damping mechanism. It should also be appreciated that the operation of the acceleration sensor assembly 410 is similar to the acceleration sensor assembly 10. It should further be appreciated that the magnet 486 and conductive members 490 form a vertical arrangement.

Referring to FIG. 6E, a still further embodiment, according to the present invention, of the acceleration sensor assembly 10 is shown. Like parts of the acceleration sensor assembly 10 have like reference numerals increased by five hundred (500). In the embodiment illustrated in FIG. 6E, the acceleration sensor assembly 510 includes the focusing member 594 disposed beneath the gimbal 562 and having a generally "U" shaped cross-section. The focusing member 594 is secured to the housing 555 by suitable means. The acceleration sensor assembly 510 includes a single conductive member 590 connected to the base wall 564 of the gimbal 562. The electric conductive member 590 is a single plate. The acceleration sensor assembly 510 includes a single magnet 586 disposed below or beneath the gimbal 562 within the focusing member 594. The acceleration sensor assembly 510 further includes the inertia member 572, out of range sensor (not shown), and sensor lever 578. It should be appreciated that the operation of the acceleration sensor assembly 510 is similar to the acceleration sensor assembly 10. It should also be appreciated that the magnet 586 and conductive member 590 have a vertical arrangement. It should further be appreciated that the acceleration sensor assembly 510 has magnetic focusing and flux redirecting. It should still further be appreciated that these various embodiments of the acceleration sensor assembly provide flexibility to package the acceleration sensor assembly according to retractor type and location preference.

Figure 7A:
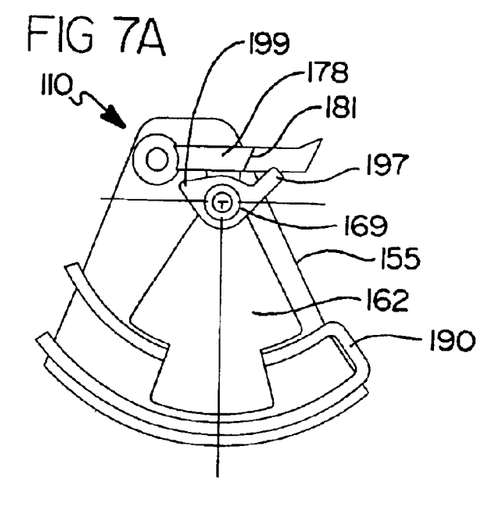
FIG. 7A is a side elevational view of the acceleration sensor assembly of FIG. 6A.
Figure 7B:
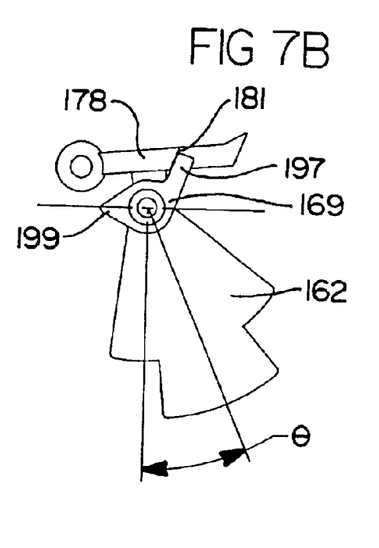
FIG. 7B is a view similar to FIG. 7A illustrating the acceleration sensor assembly in a first operational state.
Figure 7C:
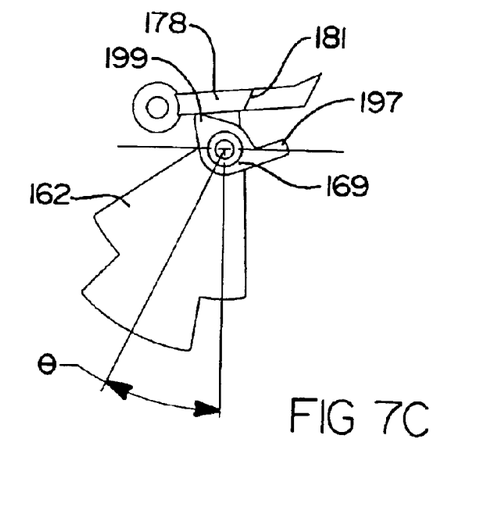
FIG. 7C is a view similar to FIG. 7A illustrating the acceleration sensor assembly in a second operational state.

Referring to FIGS. 7A through 7C, the acceleration sensor assembly 110 is shown. The acceleration sensor assembly 110 includes the out of range sensor or projection 169 that is similar to the out of range sensor 69. The out of range sensor 169 has a forward or first projection 197 and a rear or second projection 199. As illustrated in FIG. 7A, the out of range sensor 169 is shown in a non-actuating position such as zero degrees. In the case where the seat back 18b of the seat 18 is reclined rearward outside the range of the predetermined operating angle (θ) such as minus twenty five degrees, the first projection 197 of the out of range sensor 169 cooperates with the cam surface 181 on the sensor lever 178 to exert an upwardly directed force for cam action on the sensor lever 178, lifting its pawl into the actuating position as illustrated in FIG. 7B. In the case where the seat back 18b of the seat 18 is reclined forward outside the range of the predetermined operating angle (θ) such as positive twenty five degrees, the second projection 199 of the out of range sensor 169 will contact the sensor lever 178 to exert an upwardly directed force for direct action on the sensor lever 178, lifting its pawl into the actuating position as illustrated in FIG. 7C. It should be appreciated that the out of range sensor and sensor lever operate similarly for the various embodiments of the acceleration sensor assembly.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An acceleration sensor assembly for a restraint retractor of a seat restraint system in a vehicle comprising:
    an acceleration sprocket operatively connected to the restraint retractor;
    an acceleration pawl cooperating with said acceleration sprocket to operatively cause lock up of the restraint retractor;
    an inertia member cooperating with said acceleration pawl to move said acceleration pawl when an acceleration force is present;
    a gimbal to support the inertia member; and
    a non-contact damping mechanism cooperating with said gimbal to dampen movement of said gimbal until the acceleration force exceeds a predetermined value and said inertia member actuates said acceleration pawl to engage said acceleration sprocket to operatively cause lock up of the restraint retractor and prevent unwinding of a belt from the restraint retractor.

2. An acceleration sensor assembly as set forth in claim 1 wherein said damping mechanism is of a magnetic type.

3. An acceleration sensor assembly as set forth in claim 1 wherein said damping mechanism is of an eddy current magnetic type.

4. An acceleration sensor assembly as set forth in claim 1 wherein said damping mechanism comprises at least one magnet and at least one electric conductive member for cooperating with said at least one magnet.

5. An acceleration sensor assembly as set forth in claim 4 wherein either one of said at least one magnet and said at least one electric conductive member is connected to said gimbal.

6. An acceleration sensor assembly as set forth in claim 4 including a focusing member disposed below said gimbal.

7. An acceleration sensor assembly as set forth in claim 6 wherein said focusing member is generally U shaped, either one of said at least one electric conductive member and said at least one magnet being disposed within said focusing member.

8. An acceleration sensor assembly as set forth in claim 1 including an out-of-range sensor connected to said gimbal and cooperating with said acceleration pawl to lock the restraint retractor when a seat back of a seat is reclined outside a range of a predetermined operating angle.

9. An acceleration sensor assembly as set forth in claim 8 wherein said out-of-range sensor includes a projection cooperating with said acceleration pawl to lock the restraint retractor when the seat back is reclined forward outside the range of the predetermined operating angle.

10. An acceleration sensor assembly as set forth in claim 1 wherein said acceleration pawl is positioned collinearly to a pivoting axis of said gimbal.

11. An acceleration sensor assembly as set forth in claim 4 wherein said at least one electric conductive member comprises a pair of laterally spaced plates, said at least one magnet being disposed between said plates.

12. An acceleration sensor assembly as set forth in claim 4 wherein said gimbal has a projection extending therefrom, said at least one magnet being connected to said projection.

13. An acceleration sensor assembly as set forth in claim 7 wherein said at least one electric conductive member is generally U shaped, said at least one magnet being disposed within said at least one conductive member.

14. An acceleration sensor assembly as set forth in claim 4 wherein said at least one magnet is connected to a bottom of said gimbal.

15. An acceleration sensor assembly as set forth in claim 14 wherein said at least one electric conductive member is generally arcuately shaped, said at least one electric conductive member being disposed beneath said at least one magnet.

16. An acceleration sensor assembly as set forth in claim 4 wherein said at least one electric conductive member is connected to said gimbal.

17. An acceleration sensor assembly as set forth in claim 16 wherein said at least one magnet is disposed beneath said at least one electric conductive member.

18. An acceleration sensor assembly as set forth in claim 4 wherein said at least one electric conductive member and said at least one magnet has a vertical arrangement.

19. An acceleration sensor assembly as set forth in claim 4 wherein said at least one electric conductive member and said at least one magnet has a horizontal arrangement.

20. An acceleration sensor assembly as set forth in claim 1 including a support housing operatively connected to the restraint retractor, said gimbal being pivotally connected to said support housing.

21. A restraint retractor assembly for a seat restraint system in a vehicle comprising:
    a retractor housing;
    a rotatable shaft mounted to said retractor housing;
    a take-up spool mounted on said shaft and connected to a belt of a seat restraint system for winding and unwinding the belt;
    a locking sprocket operatively connected to said shaft;
    a locking pawl cooperating with said locking sprocket to lock up said restraint retractor;
    an acceleration sprocket operatively cooperating with said locking pawl;
    an acceleration pawl cooperating with said acceleration sprocket;
    an inertia member cooperating with said acceleration pawl to move said acceleration pawl when an acceleration force is present;
    a gimbal to support said inertia member; and
    a non-contact damping mechanism cooperating with said gimbal to dampen movement of said gimbal until the acceleration force exceeds a predetermined value and said inertia member actuates said acceleration pawl to engage said acceleration sprocket to operatively cause lock up the restraint retractor and prevent unwinding of a belt from the restraint retractor.

22. A restraint retractor assembly as set forth in claim 21 wherein said damping mechanism comprises at least one magnet and at least one electric conductive member for cooperating with said at least one magnet.

23. A restraint retractor assembly as set forth in claim 22 wherein either one of said at least one magnet and said at least one electric conductive member is connected to said gimbal.

24. A seat restraint system for a vehicle comprising:
- a restraint retractor for operative connection to a seat in the vehicle and connected to a belt of a seat restraint system for winding and unwinding the belt;
- an acceleration sprocket operatively connected to said restraint retractor;
- an acceleration pawl cooperating with said acceleration sprocket to operatively cause lock up of said restraint retractor;
- an inertia member cooperating with said acceleration pawl to move said acceleration pawl when an acceleration force is present;
- a gimbal to support said inertia member; and
- a non-contact damping mechanism cooperating with said gimbal to dampen movement of said gimbal member until the acceleration force exceeds a predetermined value and said inertia member actuates said acceleration pawl to engage said acceleration sprocket to operatively cause lock up the restraint retractor and prevent unwinding of a belt from the restraint retractor.

25. A seat restraint system as set forth in claim 24 wherein said damping mechanism comprises at least one magnet and at least one electric conductive member for cooperating with said at least one magnet.

26. A seat restraint system as set forth in claim 25 wherein either one of said at least one magnet and said at least one electric conductive member is connected to said gimbal.

* * * * *